United States Patent
Dole et al.

(10) Patent No.: US 11,023,512 B2
(45) Date of Patent: Jun. 1, 2021

(54) IDENTIFYING RELEVANT PAGE CONTENT

(71) Applicant: International Business Machines Corporation, Armonk, NY (US)

(72) Inventors: Bryn R. Dole, Sunnyvale, CA (US); Timothy F. Jones, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 15/153,588

(22) Filed: May 12, 2016

(65) Prior Publication Data

US 2017/0329846 A1    Nov. 16, 2017

(51) Int. Cl.
| | | |
|---|---|---|
| *G06F 16/955* | (2019.01) | |
| *G06F 16/951* | (2019.01) | |
| *G06F 16/31* | (2019.01) | |
| *G06F 16/35* | (2019.01) | |

(52) U.S. Cl.
CPC .......... *G06F 16/353* (2019.01); *G06F 16/316* (2019.01); *G06F 16/951* (2019.01); *G06F 16/955* (2019.01)

(58) Field of Classification Search
CPC ... G06F 16/951; G06F 16/9558; G06F 16/955
See application file for complete search history.

(56) References Cited

U.S. PATENT DOCUMENTS

| | | | |
|---|---|---|---|
| 8,423,495 B1 | 4/2013 | Komissarchik et al. | |
| 8,473,510 B1 * | 6/2013 | Tong | G06F 7/24 707/769 |
| 8,892,550 B2 | 11/2014 | Chu-Carroll et al. | |
| 9,165,040 B1 * | 10/2015 | Hajaj | G06F 16/951 |
| 9,372,592 B1 * | 6/2016 | Goodspeed | G06F 3/0481 |
| 9,852,215 B1 * | 12/2017 | Sullivan | G06F 16/335 |
| 2005/0197784 A1 * | 9/2005 | Kincaid | G06F 16/36 702/19 |
| 2008/0162528 A1 * | 7/2008 | Jariwala | G06F 40/169 |
| 2011/0066662 A1 * | 3/2011 | Davis | G06F 16/80 707/811 |
| 2012/0109932 A1 * | 5/2012 | Li | G06F 16/313 707/709 |
| 2012/0246100 A1 * | 9/2012 | Shehata | G06F 17/2775 706/12 |
| 2014/0173744 A1 | 6/2014 | Borohovski et al. | |
| 2015/0278359 A1 * | 10/2015 | Tang | G06F 16/951 707/706 |

* cited by examiner

*Primary Examiner* — Cheyne D Ly
(74) *Attorney, Agent, or Firm* — Zilka-Kotab, P.C.

(57) ABSTRACT

A computer-implemented method according to one embodiment includes identifying a plurality of related web pages, extracting textual data within the identified plurality of related web pages, determining a plurality of groupings of the extracted textual data, calculating a frequency of each of the determined plurality of groupings within the identified plurality of related web pages, creating a subset of the determined plurality of groupings, based on the calculated frequency of each of the plurality of groupings, and returning the subset of the determined plurality of groupings.

16 Claims, 5 Drawing Sheets

IDENTIFYING RELEVANT PAGE CONTENT

BACKGROUND

The present invention relates to textual analysis, and more specifically, this invention relates to identifying relevant content within web pages.

When retrieving web based content, some content may be repeated across a domain, sub-domain, or other subset of pages. Such repeated content may be redundant, non-topical, or otherwise not useful for analysis purposes.

SUMMARY

A computer-implemented method according to one embodiment includes identifying a plurality of related web pages, extracting textual data within the identified plurality of related web pages, determining a plurality of groupings of the extracted textual data, calculating a frequency of each of the determined plurality of groupings within the identified plurality of related web pages, creating a subset of the determined plurality of groupings, based on the calculated frequency of each of the plurality of groupings, and returning the subset of the determined plurality of groupings.

According to another embodiment, a computer program product for identifying relevant page content comprises a computer readable storage medium having program instructions embodied therewith, wherein the computer readable storage medium is not a transitory signal per se, and where the program instructions are executable by a processor to cause the processor to perform a method comprising identifying, utilizing a processor, a plurality of related web pages, extracting, utilizing a processor, textual data within the identified plurality of related web pages, determining, utilizing a processor, a plurality of groupings of the extracted textual data, calculating, utilizing a processor, a frequency of each of the determined plurality of groupings within the identified plurality of related web pages, creating, utilizing a processor, a subset of the determined plurality of groupings, based on the calculated frequency of each of the plurality of groupings, and returning, utilizing a processor, the subset of the determined plurality of groupings.

A system according to another embodiment includes a processor and logic integrated with and/or executable by the processor, the logic being configured to identify a plurality of related web pages, extract textual data within the identified plurality of related web pages, determine a plurality of groupings of the extracted textual data, calculate a frequency of each of the determined plurality of groupings within the identified plurality of related web pages, create a subset of the determined plurality of groupings, based on the calculated frequency of each of the plurality of groupings, and return the subset of the determined plurality of groupings.

Other aspects and embodiments of the present invention will become apparent from the following detailed description, which, when taken in conjunction with the drawings, illustrate by way of example the principles of the invention.

DETAILED DESCRIPTION

Figure 1:
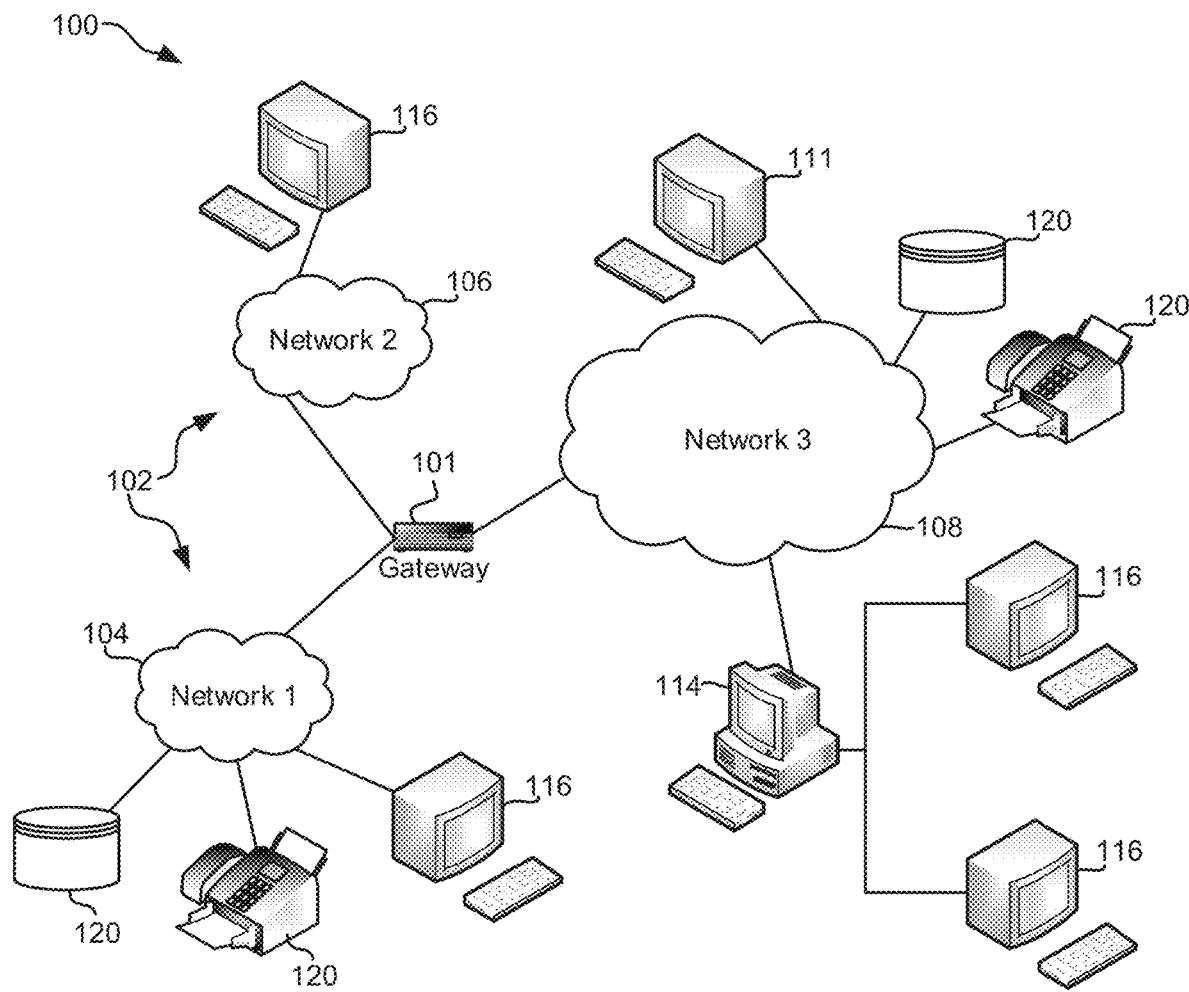
FIG. 1 illustrates a network architecture, in accordance with one embodiment.

The following description discloses several preferred embodiments of systems, methods and computer program products for identifying relevant page content. Various embodiments provide a method to extract and analyze only unique content within a web page.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying relevant page content.

In one general embodiment, a computer-implemented method includes identifying a plurality of related web pages, extracting textual data within the identified plurality of related web pages, determining a plurality of groupings of the extracted textual data, calculating a frequency of each of the determined plurality of groupings within the identified plurality of related web pages, creating a subset of the determined plurality of groupings, based on the calculated frequency of each of the plurality of groupings, and returning the subset of the determined plurality of groupings.

In another general embodiment, a computer program product for identifying relevant page content comprises a computer readable storage medium having program instructions embodied therewith, wherein the computer readable storage medium is not a transitory signal per se, and where the program instructions are executable by a processor to cause the processor to perform a method comprising identifying, utilizing a processor, a plurality of related web pages, extracting, utilizing a processor, textual data within the identified plurality of related web pages, determining, utilizing a processor, a plurality of groupings of the extracted textual data, calculating, utilizing a processor, a frequency of each of the determined plurality of groupings within the identified plurality of related web pages, creating, utilizing a processor, a subset of the determined plurality of groupings, based on the calculated frequency of each of the plurality of groupings, and returning, utilizing a processor, the subset of the determined plurality of groupings.

In another general embodiment, a system includes a processor and logic integrated with and/or executable by the processor, the logic being configured to identify a plurality of related web pages, extract textual data within the identified plurality of related web pages, determine a plurality of groupings of the extracted textual data, calculate a frequency of each of the determined plurality of groupings within the identified plurality of related web pages, create a subset of the determined plurality of groupings, based on the calculated frequency of each of the plurality of groupings, and return the subset of the determined plurality of groupings.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
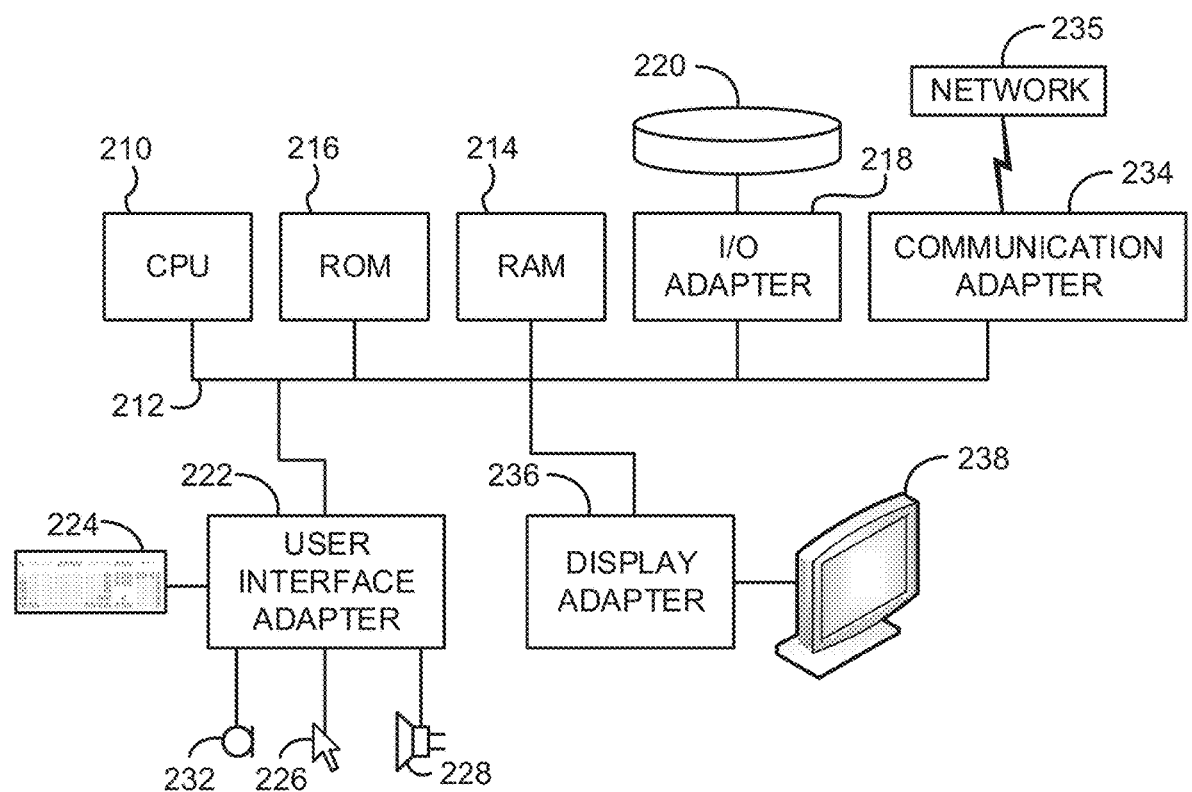
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
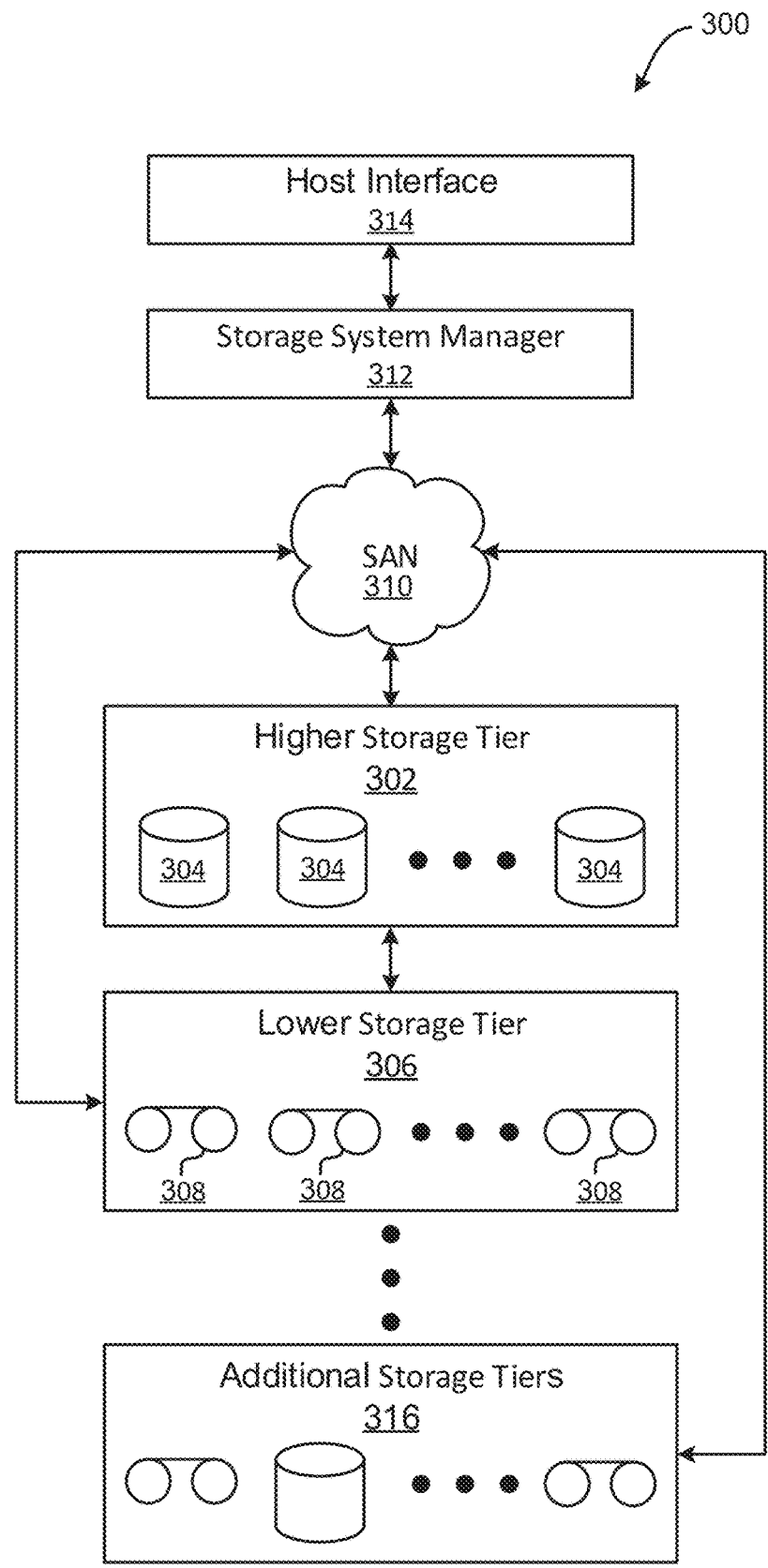
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
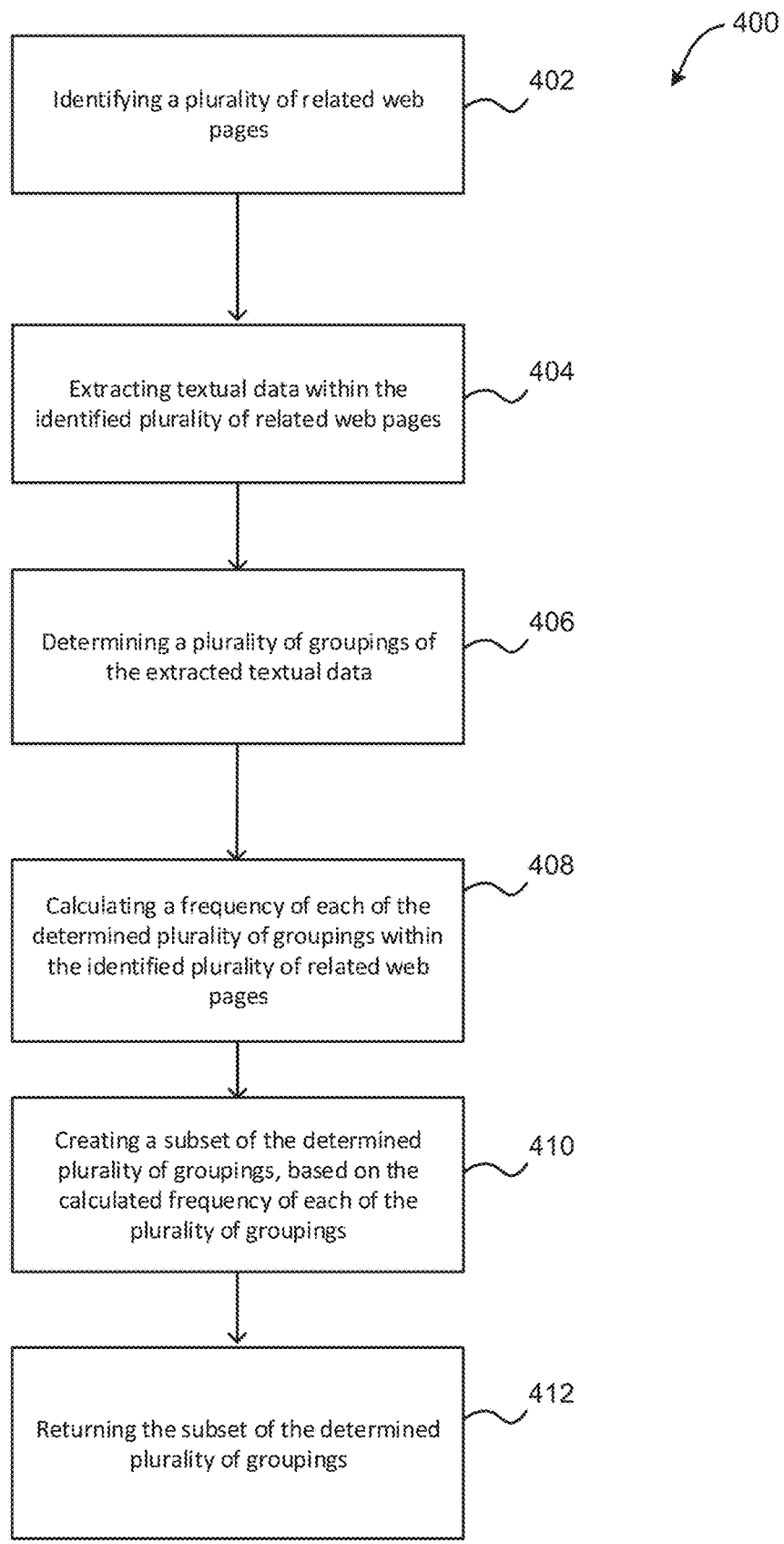
FIG. 4 illustrates a method for identifying relevant page content, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of related web pages are identified. In one embodiment, the plurality of related web pages may include a plurality of web pages within a single domain. For example, the plurality of related web pages may include a root domain of a web site and all sub-domains found below the root domain. In another embodiment, the plurality of web pages may be identified by crawling a web site containing the plurality of web pages. For example, an Internet bot (e.g., a web crawler, etc.) may systematically browse and review all content (e.g., (hypertext markup language (HTML) content, etc.) of all web pages found within a predetermined web site.

Additionally, in one embodiment, identifying the plurality of related web pages may include analyzing a uniform resource locator (URL), a domain, and all sub-domains within that domain in order to determine relationships between the plurality of web pages. In another embodiment, identifying the plurality of related web pages may include determining a distance of one or more sub-domains from a root domain (e.g., using a top-end combinator, etc.). In yet another embodiment, these determinations may be used to group each web page of the plurality of related web pages into one or more predetermined groups (e.g., based on the determined relationships, determined distance, etc.).

In still another embodiment, the plurality of web pages may be identified by a computing device such as a server, a cloud computing device, a web crawling device, a personal computing device, a mobile computing device, etc.

Further, as shown in FIG. 4, method 400 may proceed with operation 404, where textual data within the identified plurality of related web pages is extracted. In one embodiment, the textual data may include visible text that is presented to a viewer of each of the identified plurality of web pages. For example, the textual data may include alphanumerical data, symbolic data, etc. In another embodiment, extracting the textual data from within the identified plurality of related web pages may include identifying user-readable text from within the identified plurality of related web pages, utilizing one or more applications. For example, an application program interface (e.g., AlchemyAPI, etc.) may be used to identify user-readable text within each of the identified plurality of related web pages. In yet another embodiment, textual data may be extracted for all related web pages within a predetermined group.

Further still, as shown in FIG. 4, method 400 may proceed with operation 406, where a plurality of groupings of the extracted textual data are determined. In one embodiment, each of the plurality of determined groupings may include one or more textual excerpts (e.g., one or more terms, sentences, portions of sentences, phrases, passages, paragraphs, etc.) found within the plurality of web pages. In another embodiment, the plurality of groupings may be created by breaking a block of text into one or more phrases, one or more sentences, etc. (e.g., resulting in a list of one or more phrases and/or sentences). In yet another embodiment, each of the determined plurality of groupings may be associated (e.g., linked, etc.) to the web page in which the grouping is located.

Also, as shown in FIG. 4, method 400 may proceed with operation 408, where a frequency of each of the plurality of groupings is calculated within the identified plurality of web pages. In one embodiment, a count and/or weight may be associated with each of the plurality of groupings, and for each of the groupings, the count may be incremented each time the grouping is identified within the identified plurality of web pages. In another embodiment, for each of the plurality of groupings, the count and/or weight associated with the grouping may indicate the frequency of the grouping.

Additionally, in one embodiment, the plurality of groupings may be ranked according to the calculated frequency. For example, the plurality of groupings may be ranked from most frequently occurring to least frequently occurring. In another embodiment, a histogram may be created that identifies the calculated frequency of each of the plurality of groupings. In yet another embodiment, a frequency of each of the plurality of groupings may calculated only for groupings occurring in all related web pages within a predetermined group.

Furthermore, as shown in FIG. 4, method 400 may proceed with operation 410, where a subset of the determined plurality of groupings is created, based on the calculated frequency of each of the plurality of groupings. In one embodiment, the subset of the determined plurality of groupings may be created by removing a portion of groupings from the determined plurality of groupings, based on the calculated frequency of each of the plurality of groupings. In another embodiment, if the plurality of groupings are ranked and listed according to their calculated frequencies, with groupings having the larger frequencies being listed higher than groupings with smaller frequencies, the subset may be created by removing a predetermined number of groupings at the top of the list (e.g., groupings that are determined to be common, etc.).

Further still, in one embodiment, if a histogram is created that identifies the calculated frequency of each of the plurality of groupings, the subset may be created by analyzing the histogram and removing one or more groupings located at a predetermined portion of the histogram (e.g., the middle of the histogram, etc.). In another embodiment, creating the subset may include comparing the calculated frequency for each of the determined plurality of groupings to a predetermined threshold, and removing groupings having a calculated frequency above the threshold. In another embodiment, the predetermined threshold may be adjusted based on feedback (e.g., user feedback, application feedback, etc.).

Also, in one embodiment, one or more groupings may be prevented from being removed from the plurality of groupings. For example, one or more groupings may be included in an exception list (e.g., of groupings that are common but are not to be removed, etc.). In another embodiment, textual data surrounding a grouping may be analyzed. For example, a sliding window algorithm may be used to identify and analyze groupings immediately before and after a particular grouping that is determined to be removed (e.g., identified as common, etc.). In another example, if a predetermined number of groupings immediately before and after the particular grouping are not determined to be removed (e.g., are determined to be uncommon, etc.), then the particular grouping may not be removed, and may be marked as an anomaly, an exception, etc.

Additionally, in one embodiment, all instances of a removed grouping may be removed from the plurality of groupings. For example, if it is determined that a particular grouping is to be removed from the plurality of groupings, then all instances of the particular grouping may be removed from the plurality of groupings. In another embodiment, a single instance of a removed grouping may be retained. For example, if it is determined that a particular grouping is to be removed from the plurality of groupings, then all instances of the particular grouping except for one instance of the particular grouping may be removed from the plurality of groupings. In this way, extraneous processing of redundant information may be avoided.

Further, as shown in FIG. 4, method 400 may proceed with operation 412, where the subset of the plurality of groupings is returned. In one embodiment, returning the subset of the plurality of groupings may include storing the subset (e.g., in an index, in a database, etc.). In another embodiment, a search may be performed using the stored subset of the plurality of groupings. In yet another embodiment, processing may be performed on the stored subset of the plurality of groupings (e.g., using natural language processing, etc.).

In this way, repeated, redundant content (e.g. headers, footers, boilerplate, navigational text or regions, advertisements, etc.) may be removed from a corpus of textual data, which may help identify unique content within a plurality of web pages. Additionally, by removing redundant textual data from a corpus of textual data to be processed, a performance of the processing may be improved, battery life of a device may be enhanced, etc.

Figure 5:
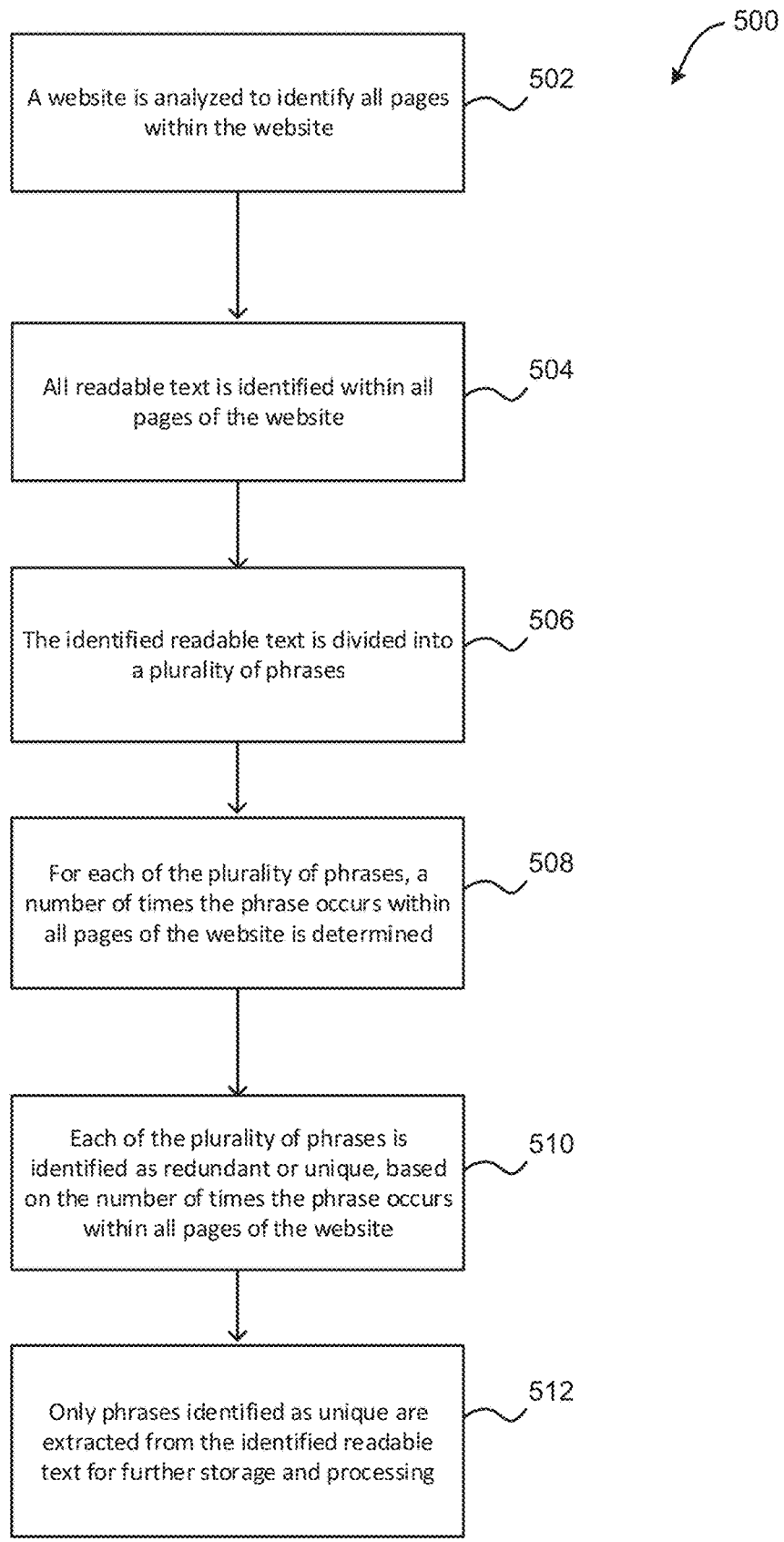
FIG. 5 illustrates a method for identifying redundant phrases, in accordance with one embodiment.

Now referring to FIG. 5, a flowchart of a method 500 for identifying redundant phrases is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a website is analyzed to identify all pages within the website. In one embodiment, a bot may crawl the entirety of the website domain in order to identify all pages (e.g., root pages, sub-pages, etc.) within that website domain. Additionally, method 500 may proceed with operation 504, where all readable text is identified within all pages of the website. In one embodiment, the readable text may be identified by parsing all readable text during crawling.

Further, method 500 may proceed with operation 506, where the identified readable text is divided into a plurality of phrases. In one embodiment, each of the plurality of phrases may include a combination of words within the readable text (e.g., all or a portion of a sentence, etc.). Further still, method 500 may proceed with operation 508, where for each of the plurality of phrases, a number of times the phrase occurs within all pages of the website is determined. For example, a count may be associated with each of the plurality of phrases, where the count is incremented each time the phrase is identified within a review of the identified readable text.

Also, method 500 may proceed with operation 510, where each of the plurality of phrases is identified as redundant or unique, based on the number of times the phrase occurs within all pages of the website. In one embodiment, the count associated with each phrase may be compared to a threshold number, and the phrase may be identified as redundant if the count exceeds the threshold number. In another embodiment, the phrase may be identified as unique if the count does not exceed the threshold number.

In addition, method 500 may proceed with operation 512, where only phrases identified as unique are extracted from the identified readable text for further storage (e.g., indexing, etc.) and processing. In this way, processing of redundant phrases within the identified readable text may be avoided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a plurality of related web pages based on a determined distance of each of the plurality of related web pages from a root domain;
   extracting textual data within the plurality of related web pages;
   determining a plurality of groupings of the textual data;
   calculating a frequency of each of the plurality of groupings within the plurality of related web pages, including:
      associating a count with each of the plurality of groupings, and
      for each of the plurality of groupings, incrementing the count associated with the grouping each time the grouping is identified within the plurality of related web pages;
   creating a subset of the plurality of groupings, based on the frequency of each of the plurality of groupings, including:
      for each of the plurality of groupings, removing the grouping from the plurality of groupings if the associated count for the grouping is greater than a predetermined threshold value, including:
      identifying a grouping to be removed from the plurality of groupings,
      determining within the textual data, for the grouping to be removed, a first number of groupings located immediately before the grouping that are not determined to be removed,
      determining within the textual data, for the grouping to be removed, a second number of groupings located immediately after the grouping that are not determined to be removed,
      preventing a removal of the grouping to be removed, and marking the grouping to be removed as an exception, in response to determining that a total number of the first number of groupings and the second number of groupings exceed a predetermined number of groupings, and
      removing the grouping in response to determining that the total number of the first number of groupings and the second number of groupings does not exceed the predetermined number of groupings; and
   returning the subset of the plurality of groupings.

2. The computer-implemented method of claim 1, wherein the plurality of related web pages is identified by crawling a web site containing the plurality of related web pages.

3. The computer-implemented method of claim 1, wherein each of the plurality of groupings includes a phrase found within the plurality of related web pages.

4. The computer-implemented method of claim 1, wherein a count is associated with each of the plurality of groupings, and for each of the plurality of groupings, the count is incremented each time the grouping is identified within the plurality of related web pages.

5. The computer-implemented method of claim 1, wherein the plurality of groupings is ranked according to the frequency.

6. The computer-implemented method of claim 1, wherein the plurality of related web pages are included within a single root domain of a web site and all subdomains found below the single root domain.

7. The computer-implemented method of claim 1, wherein the distance of each of the plurality of related web pages from the root domain is determined using a top-end combinator.

8. The computer-implemented method of claim 1, wherein returning the subset of the plurality of groupings includes storing the subset of the plurality of groupings in an index.

9. A computer program product for identifying relevant page content, the computer program product comprising a computer readable storage medium having program instructions embodied therewith, wherein the computer readable storage medium is not a transitory signal per se, the program instructions executable by a processor to cause the processor to perform a method comprising:
   identifying, utilizing the processor, a plurality of related web pages based on a determined distance of each of the plurality of related web pages from a root domain;
   extracting, utilizing the processor, textual data within the plurality of related web pages;
   determining, utilizing the processor, a plurality of groupings of the textual data;
   calculating, utilizing the processor, a frequency of each of the plurality of groupings within the plurality of related web pages, including:
      associating a count with each of the plurality of groupings, and
      for each of the plurality of groupings, incrementing the count associated with the grouping each time the grouping is identified within the plurality of related web pages;
   creating, utilizing the processor, a subset of the plurality of groupings, based on the frequency of each of the plurality of groupings, including:
      identifying a grouping to be removed from the plurality of groupings, determining within the textual data, for the grouping to be removed, a first number of groupings located immediately before the grouping that are not determined to be removed, determining within the textual data, for the grouping to be removed, a second number of groupings located immediately after the grouping that are not determined to be removed, preventing a removal of the grouping to be removed, and marking the grouping to be removed as an exception, in response to determining that a total number of the first number of groupings and the second number of groupings exceed a predetermined number of groupings, and removing the grouping in response to determining that the total number of the first number of groupings and the second number of groupings does not exceed the predetermined number of groupings; and returning, utilizing the processor, the subset of the plurality of groupings.

10. The computer program product of claim 9, wherein the plurality of related web pages is identified by crawling a web site containing the plurality of related web pages.

11. The computer program product of claim 9, wherein each of the plurality of groupings includes a phrase found within the plurality of related web pages.

12. The computer program product of claim 9, wherein the distance of each of the plurality of related web pages from the root domain is determined using a top-end combinator.

13. The computer program product of claim 9, wherein the plurality of groupings is ranked according to the frequency.

14. The computer program product of claim 9, wherein the plurality of related web pages are included within a single root domain of a web site and all sub-domains found below the single root domain.

15. The computer program product of claim 9, further comprising creating a histogram that identifies the calculated frequency of each of the plurality of groupings within the plurality of related web pages.

16. A system, comprising:
a processor and logic integrated with the processor, executable by the processor, or integrated with and executable by the processor, the logic being configured to:
identify a plurality of related web pages based on a determined distance of each of the plurality of related web pages from a root domain;
extract textual data within the plurality of related web pages;
determine a plurality of groupings of the textual data;
calculate a frequency of each of the plurality of groupings within the plurality of related web pages, including:
associating a count with each of the plurality of groupings, and
for each of the plurality of groupings, incrementing the count associated with the grouping each time the grouping is identified within the plurality of related web pages;
create a subset of the plurality of groupings, based on the frequency of each of the plurality of groupings, including:
for each of the plurality of groupings, removing the grouping from the plurality of groupings if the associated count for the grouping is greater than a predetermined threshold value, including:
identifying a grouping to be removed from the plurality of groupings,
determining within the textual data, for the grouping to be removed, a first number of groupings located immediately before the grouping that are not determined to be removed,
determining within the textual data, for the grouping to be removed, a second number of groupings located immediately after the grouping that are not determined to be removed,
preventing a removal of the grouping to be removed, and marking the grouping to be removed as an exception, in response to determining that a total number of the first number of groupings and the second number of groupings exceed a predetermined number of groupings, and
removing the grouping in response to determining that the total number of the first number of groupings and the second number of groupings does not exceed the predetermined number of groupings; and
return the subset of the plurality of groupings.

* * * * *